(12) United States Patent
Takada et al.

(10) Patent No.: US 7,176,973 B2
(45) Date of Patent: Feb. 13, 2007

(54) IRIS CAMERA MODULE

(75) Inventors: Noboru Takada, Yokohama (JP); Yutaka Kitahara, Yokohama (JP); Jyoji Wada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 729 days.

(21) Appl. No.: 09/900,370

(22) Filed: Jul. 6, 2001

(65) Prior Publication Data
US 2002/0008768 A1    Jan. 24, 2002

(30) Foreign Application Priority Data
Jul. 10, 2000 (JP) .................. P. 2000-208461
Jun. 25, 2001 (JP) .................. P. 2001-191304

(51) Int. Cl.
H04N 5/225 (2006.01)
G02B 13/16 (2006.01)

(52) U.S. Cl. .......................... 348/335; 348/340
(58) Field of Classification Search ............ 348/333.03
See application file for complete search history.

(56) References Cited

U.S. PATENT DOCUMENTS 4,641,349 A * 2/1987 Flom et al. ................. 382/117
5,581,630 A * 12/1996 Bonneau, Jr. ............... 382/116
5,751,836 A * 5/1998 Wildes et al. ............... 382/117
5,862,247 A * 1/1999 Fisun et al. ................. 382/116
5,901,238 A * 5/1999 Matsushita .................. 382/117
6,333,988 B1 * 12/2001 Seal et al. ................... 382/117
6,532,298 B1 * 3/2003 Cambier et al. ............ 382/117
6,591,001 B1 * 7/2003 Oda et al. ................... 382/117

FOREIGN PATENT DOCUMENTS

JP          9-201348         8/1997

* cited by examiner

Primary Examiner—Vivek Srivastava
Assistant Examiner—Yogesh Aggarwal
(74) Attorney, Agent, or Firm—Pearne & Gordon LLP

(57) ABSTRACT

An iris camera module includes an image pickup optical system and a target optical system and the optical path is divided by a half mirror. An image of an iris is picked up by an image pickup element of an image pickup section. The iris image thus picked up is compared with a reference iris image stored in a storage in advance and the comparison result is output. The iris camera module has a configuration fit for a compact design. The reference iris image as a reference for comparison is stored in the storage of the comparison chip. It is thus difficult to falsify the reference iris image thereby providing a high security.

6 Claims, 7 Drawing Sheets

IRIS CAMERA MODULE

BACKGROUND OF THE INVENTION

The present invention relates to technologies concerning an iris camera module for picking up an image of an iris in an eye.

Systems have been introduced for inhibiting entrance of persons except those who are permitted to enter a room or a building in the area under security control in order to ensure security in a company, laboratory, or government office. Those who are admitted enters a secret number given to the system in advance or pass a card where personal identification information is recorded through a card reader to enter an area under security control.

In such a system, the persons who are admitted may be inhibited from entering the area because they have forgotten the secret number or their card, or they have had the secret number leaked or their card stolen.

In order to cope with such a problem, an iris image pickup system has been proposed for picking the image of the iris of an eye of a person who is entering the area under security control, coding the iris picked up, and comparing the coded information with the information of an iris stored in advance to determine whether the person is admitted.

In this iris image pickup system, the secret number or card is not required, and the iris image pickup system is less subject to leakage or theft or more difficult to falsify than the secret number or card, thus providing higher security.

The related art iris image pickup system picks up the image of the iris of a person entering an area under security control and determine whether the person is admitted. In particular, image pickup apparatus for picking up the image of the iris of a person entering an area under security control is provided per doorway of the area under security control. The iris image picked up by the image pickup apparatus per doorway is compared with the iris image stored in advance by the central processing unit (CPU) of the iris image pickup system.

The iris image pickup system is thus large-sized. Related art image pickup apparatus does not consider a compact design and does not have a configuration or form fit for a compact design.

For related art compact apparatus such as a portable terminal, unauthorized use of such compact apparatus is prevented by entering a secret number in order to restrict the use of a portable terminal to predetermined persons or prevent look through or modify personal information including a secret number or personal information on the user or his/her acquaintances.

However, the authorized user cannot use the portable terminal or get another person to use the portable terminal in case the user has forgotten the secret number or the secret number has been leaked or stolen.

Thus, a highly secure personal authentication system is in need in a portable terminal, instead of the related art secret number system that may be forgotten.

A configuration using the related art iris image pickup system as a personal authentication system for compact apparatus, for example a portable terminal, is not fit for the portable terminal since the image pickup apparatus and the CPU are separately provided.

SUMMARY OF THE INVENTION

The invention has been proposed in view of the aforementioned situation and aims at providing an iris camera module fit for a compact design and an iris camera module with high security.

An iris camera module according to the invention for solving the above problem, comprises:
an image pickup optical system for picking up the image of the iris; and
a target optical system for displaying the target of the eye, wherein the target optical system and the image pickup optical system are integrated.

According to the iris camera module, it is possible to downsize the iris camera module since the image pickup optical system and the target optical system are integrated. Thus, it is possible to incorporate the iris camera module into a portable terminal.

Further, the iris camera module according to the invention,
wherein the image pickup optical system includes:
an infrared illuminating section for irradiating an infrared ray onto the eye;
an image pickup section for picking up the image of the iris by detecting the infrared ray reflected on the eye; and
an image pickup optical section for guiding the infrared ray reflected on the eye to the image pickup section,
wherein the target optical system includes:
a target screen where the target is displayed; and
a target optical section for guiding the image of the target on the target screen to the eye.

The iris camera module irradiates an infrared ray onto an eye so that it can pick up an iris image without causing a pupillary reflex.

A target screen is provided so that target of an eye is set to a predetermined position and the iris image to be picked up can be set to a predetermined position.

Further, the iris camera module according to the invention,
wherein the image pickup optical section and the target optical section include a common half mirror for reflecting to guide the infrared ray reflected on the eye to the image pickup section and guiding the image of the target on the target screen to the eye without reflecting the image.

The iris camera module uses the optical system up to the half mirror for the image pickup optical section and the target optical section in common so that it is possible to downsize the optical system included in the iris camera module. It is possible to align the direction of reflection to the image pickup section by setting the angle of the half mirror from the optical axis of an eye. This improves the freedom of layout of the image pickup section.

Moreover, the iris camera module according to the invention,
wherein the image pickup optical section and the target optical section include a common half mirror for guiding the infrared ray reflected on the eye to the image pickup section without reflecting the infrared ray and reflecting to guide the image of the target on the target screen to the eye.

The iris camera module uses the optical system up to the half mirror for the image pickup optical section and the target optical section in common so that it is possible to downsize the optical system included in the iris camera module. It is possible to align the direction of irradiation from the target optical section to an eye by setting the angle of the half mirror from the optical axis of an eye. This improves the freedom of layout of the image pickup section.

Furthermore, the iris camera module according to the invention, wherein the target optical system includes a screen illuminating section for illuminating the target screen.

The iris camera module irradiates via a screen illuminating section even when the target screen is dark. It is thus possible to keep the target screen at a predetermined brightness.

Further, the iris camera module according the invention, wherein the image pickup section includes:

an image pickup element for picking up the image of the iris;

a storage for storing a reference iris information; and a comparator section for comparing an information based on the image of the iris picked up by the image pickup section with the reference iris information to output the comparison result as to whether matching is obtained.

The iris camera module has an image pickup section that comprises an image pickup element, a storage and a comparator section so that the reference iris information does not leak outside the image pickup section thus improving the security.

Moreover, the iris camera module according to the invention, wherein the reference iris information can be overwritten only a predetermined number of times in the storage.

In the iris camera module, the reference iris information in the storage can be overwritten only a predetermined number of times. This reduces the risk of falsification of the reference iris information. Setting the number of predetermined times to 1 to allow writing of a reference iris information only once eliminates the risk of falsification of the reference iris image.

Furthermore, the iris camera module according to the invention, wherein the image pickup section includes:

an image pickup element for picking up the image of the iris; and a connector section for coupling an external circuit detachable from the image pickup section, wherein the external circuit includes:

a storage for storing a reference iris information; and a comparator section for comparing an information based on the iris picked up by the image pickup section with the reference iris information to output the comparison result as to whether matching is obtained.

Via the iris camera module, it is possible to provide a personal external circuit by providing an image pickup section with an external circuit having a storage and a comparator section that are detachable. By attaching the personal external circuit to an iris camera module to determine the iris, it is possible to prevent overwriting of personal iris data.

DETAILED DESCRIPTION OF THE PREFERRED EMBODIMENT

Embodiment 1

Figure 1:
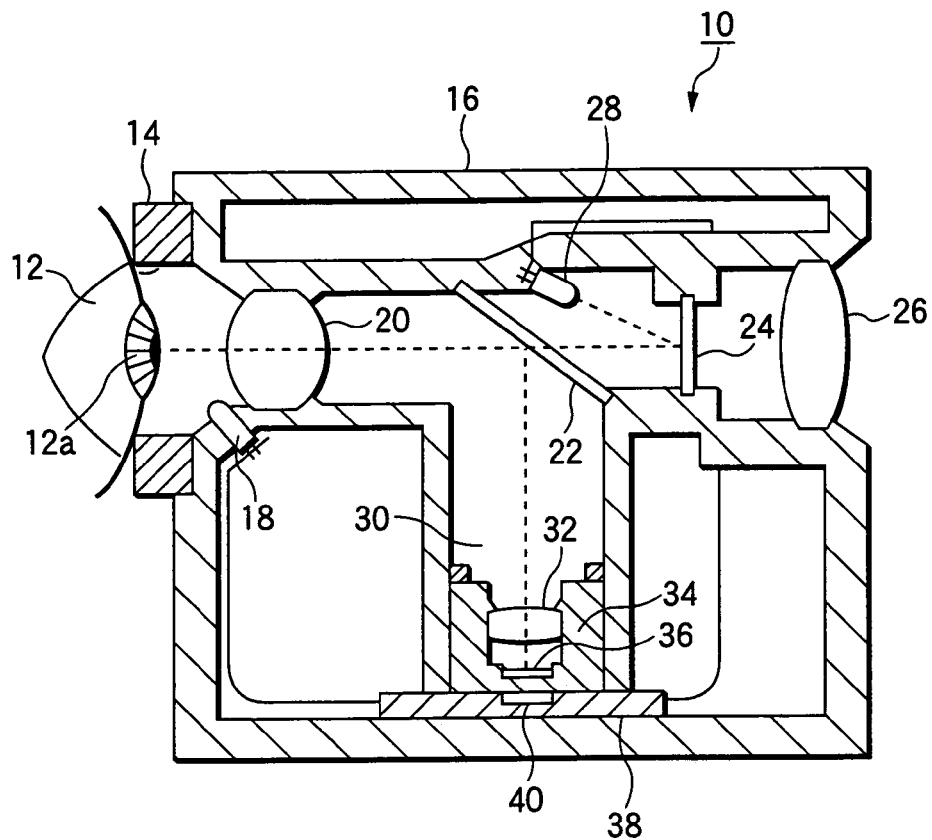
FIG. 1 is a sectional view of an iris camera module according to the first embodiment of the invention.
Figure 2:
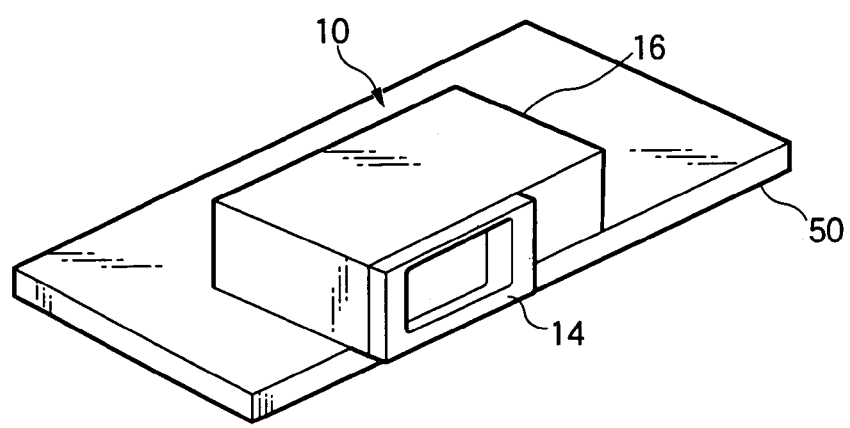
FIG. 2 is a perspective view showing the mounting state of an iris camera module.
Figure 3:
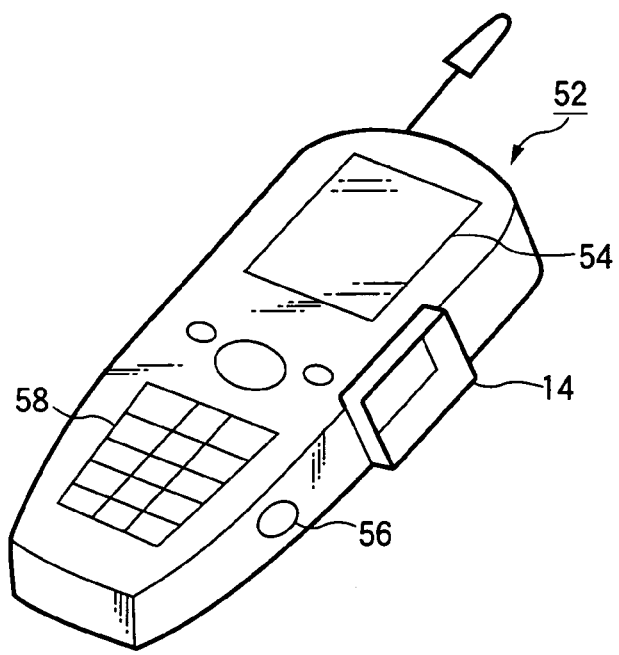
FIG. 3 is a perspective view of a portable terminal where an iris camera module is incorporated.
Figure 4:
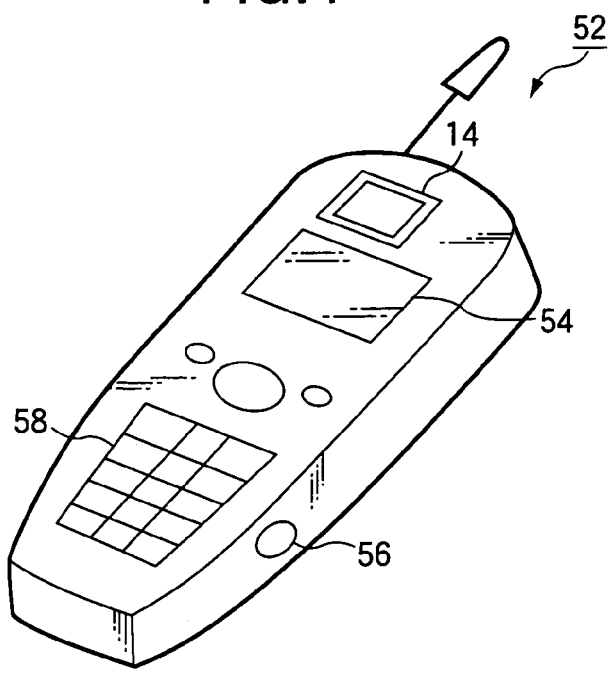
FIG. 4 is a perspective view of a second portable terminal where an iris camera module is incorporated.
Figure 5:
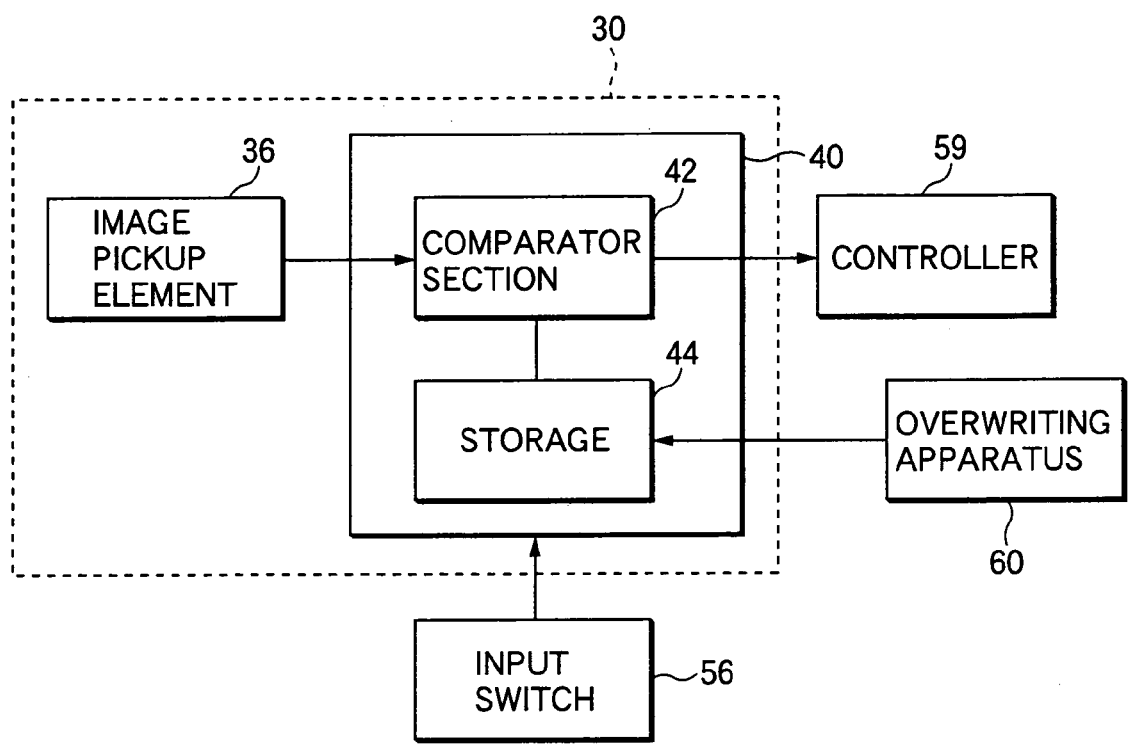
FIG. 5 is a block diagram of the configuration of an image pickup section.
Figure 6:
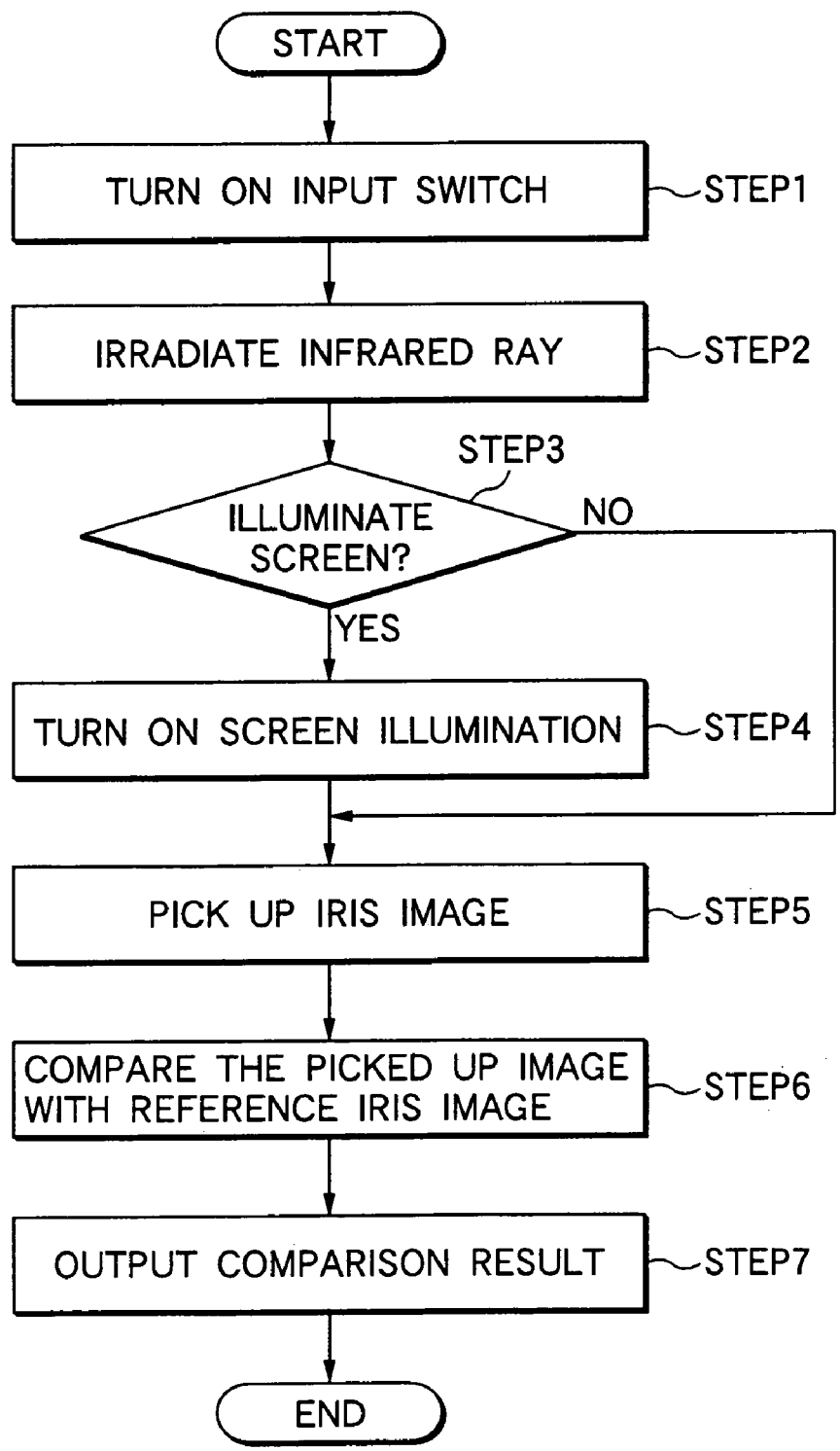
FIG. 6 is a flowchart of authentication operation.

FIG. 1 is a sectional view of an iris camera module according to the first embodiment of the invention. FIG. 2 is a perspective view showing the mounting state of an iris camera module. FIG. 3 is a perspective view of a portable terminal where an iris camera module is incorporated. FIG. 4 is a perspective view of a second portable terminal where an iris camera module is incorporated. FIG. 5 is a block diagram of the configuration of an image pickup section. FIG. 6 is a flowchart of authentication operation.

Configuration of an iris camera module according to the first embodiment will be described referring to FIG. 1.

From the external view, an iris camera module 10 includes an eyepiece section 14 for an eye 12 and a base unit 16 as a base of an iris camera module 10.

FIG. 2 shows the state where the iris camera module 10 is mounted on a substrate 50. The iris camera module 10 is a single integral-type unit that can be mounted, same as other on-board parts.

FIG. 3 shows a perspective view of a portable terminal 52 where the iris camera module 10 mounted on the substrate 50 is incorporated. The face looked through the eyepiece section 14 in the portable terminal 52 may be provided on the right side of the portable terminal 52 as shown in FIG. 3, or on the same face as a display 54 of the portable terminal as shown in FIG. 4. The portable terminal 52 comprises an input switch 56 for picking up of an image of an iris 12a image to start authentication operation of an iris image. Trigger of the authentication may be made via a predetermined key on a ten-key pad 58 or a combination of keys.

Configuration of the iris camera module 10 will be described again.

The inside of the base unit 16 can be roughly divided into an image pickup optical system and a target optical system.

The image pickup optical system includes an infrared LED 18 as an infrared illuminating section for irradiating an infrared ray to illuminate the eye 12, an eyepiece 20, a half mirror 22 for reflecting a infrared ray (iris image) reflected on an iris 12a of the eye 12 toward an image pickup section 30, and the image pickup section 30. While an irradiated light toward the eye 12 is an infrared ray, any other irradiated light may apply unless a pupillary reflex is not caused.

The image pickup section 30 includes an imaging lens 32 for imaging an iris image on an image pickup element 36, an image pickup unit 34 for integrating the imaging lens 32 and the image pickup element 36, the image pickup element 36 for picking up an iris image, an image pickup substrate 38 fixed to the image pickup unit 34, and a comparison chip mounted on the image pickup substrate 38 for inputting the iris image from the image pickup element 36.

The comparison process chip 40 in the image pickup section 30 will be described referring to FIG. 5. The comparison process chip 40 incorporates a storage 44 for storing an iris image as a reference (a reference iris image) and a comparator section 42 for comparing the image of the iris from the image pickup element 36 with the reference iris image to output the comparison result as to whether matching is obtained, to a controller 59 provided in the portable terminal 52.

The controller 59 controls each unit of the portable terminal. The comparison result in the comparator 42 has determined that matching is obtained, and the controller 59 can turn on the power of the portable terminal 52 or look through or modify personal information stored in a predetermined unit of the portable terminal 52 including a secret number or personal information on the user or his/her acquaintances.

A reference iris information can be stored into the storage 44 only a predetermined number of times by overwriting apparatus 60 external to the iris camera module 10. In case the predetermined number of overwrite times is 1, falsification of the reference iris information is impossible and thus the security is high. A capability of managing the overwriting apparatus 60 for overwriting the reference iris information further improves the security.

The comparison process chip 40 is a semiconductor IC such as an ASIC (Application Specific Integrated Circuit) and is composed of a single chip. Thus the reference iris image stored in the storage 44 is never output from the comparison process chip 40. This prevents the reference iris image from leaking, thus upgrading the security.

The target optical system includes: a target screen illuminating LED 28; a translucent target screen 24 having a display for setting the target of an eye 12 to a predetermined position, reflecting an irradiated light from the target screen illuminating LED 28 and transmitting external lights from a condensing lens 26; the condensing lens 26 for condensing external lights on the rear side of the target screen 24; a half mirror 22 for transmitting the display image on the target screen 24; and an eyepiece 20. The display on the target screen 24 may be of any type in case the target of the eye 12 is recognized.

The eyepiece 20 and the half mirror 22 are used in common by the image pickup optical system and the target screen optical system.

While the half mirror 22 transmits the display image on the target screen 24 and reflects the iris image toward the image pickup section 30 in this embodiment, positions of the image pickup optical system and the target screen optical system may be reversed to use the half mirror 22 to reflect the display image on the target screen 24 toward the eye 12 and to transmit the iris image for picking up the image in the image pickup section 30.

Next, the operation of image pickup and authenticating an iris image via the portable terminal 52 incorporating the iris camera module 10 will be described referring to FIG. 6.

FIG. 6 is a flowchart of authentication operation.

The user applies his/her eye 12 on the eyepiece 14 and looks into the base unit 16, then turns on the input switch 56 to start picking up the iris image (Step 1).

When the input switch 56 is turned on, the infrared LED 18 comes on to irradiates an infrared ray on the iris 12a (Step 2).

At the same time the input switch 56 is turned on, it is determined whether the target screen illuminating LED 28 will illuminate the target screen 24 (Step 3). In case lights (external lights) around the portable terminal 52 are above a predetermined brightness as detected by a photo sensor (not shown), illumination via the target screen illuminating LED 28 is skipped and execution goes to Step 5. In case external lights are below the predetermined brightness, illumination via the target screen LED 28 is tuned on (Step 4).

Next, the iris image reflected on a half mirror 22 is picked up by the image pickup element 36 of the image pickup section 30 (Step 5). The iris image picked up by the image pickup element 36 is sent to the comparator section of the comparison chip 40.

In the comparison section 42, the picked up iris image is compared with the reference iris image stored in the storage 44 in advance (Step 6). The reference iris image stored in the storage in advance is the iris image of the authorized user of the portable terminal 52.

The comparison result of a picked up iris image with the reference iris image is output to the controller 59 (Step 7).

For example, in case the output comparison result is "matching obtained," it is possible to turn on the power so that the portable terminal 52 may be used and look through or modify personal information stored in the portable terminal. In case the comparison result is "matching not obtained," it is not possible to perform such an operation.

It is thus possible to use the iris camera module 10 to improve the security of the portable terminal 52.

According to the invention, a target optical system is provided with its optical axis aligned with that of an image pickup optical system. By applying an eye on the eyepiece of the image pickup optical system and looking into the target screen 24, the image pickup optical system can capture the iris of a person under authentication.

Embodiment 2

Next, configuration of an iris camera module according to the second embodiment will be described referring to FIG. 7.

Figure 7:
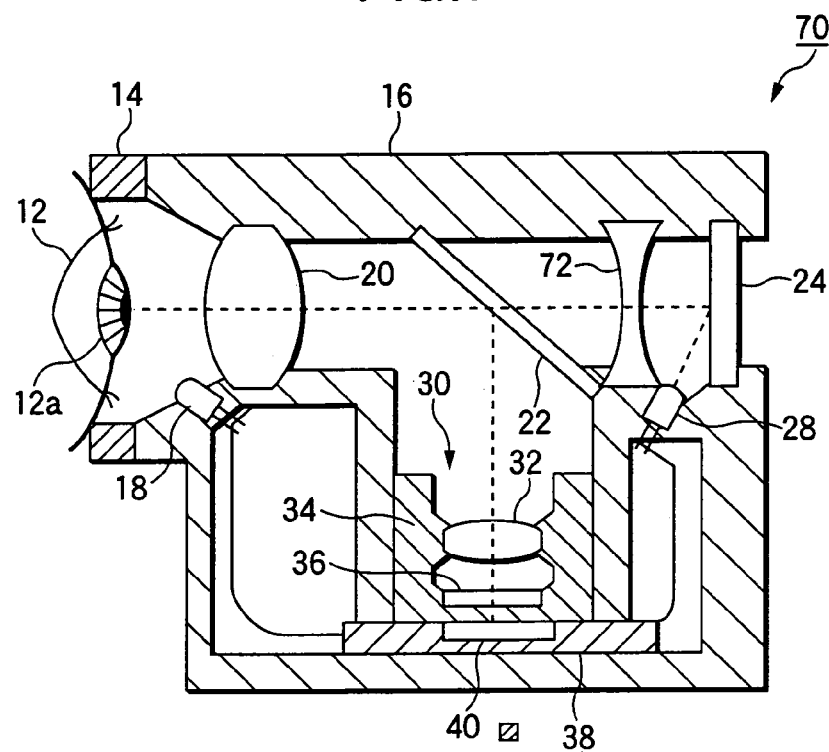
FIG. 7 is a sectional view of an iris camera module according to the second embodiment.

FIG. 7 is a sectional view of an iris camera module according to the second embodiment.

In the iris camera module 70, the positions of the image pickup optical system and the target screen optical system are the same as those in the iris camera module 10 according to the first embodiment, except that the configuration of the target optical system is partially different. In FIG. 7, the same configuration as that of the iris camera module 10 in FIG. 1 is assigned the same numerals and corresponding description is omitted.

The iris camera module 70 differs from the iris camera module 10 in that the iris camera module 70 does not comprise a condensing lens for gathering external lights for the target screen 24, that a biconcave lens 72 is provided between the half mirror 22 and the target screen 24, and that the mounting position of the target screen illumination LED 28 is moved to the image pickup section 30, between the biconcave lens 72 and the target screen 24.

Using the iris camera module 70 according to the second embodiment for the portable terminal 52 provides the same advantage as the iris camera module 10.

Embodiment 3

Next, configuration of an iris camera module according to the third embodiment will be described referring to FIG. 8.

Figure 8:
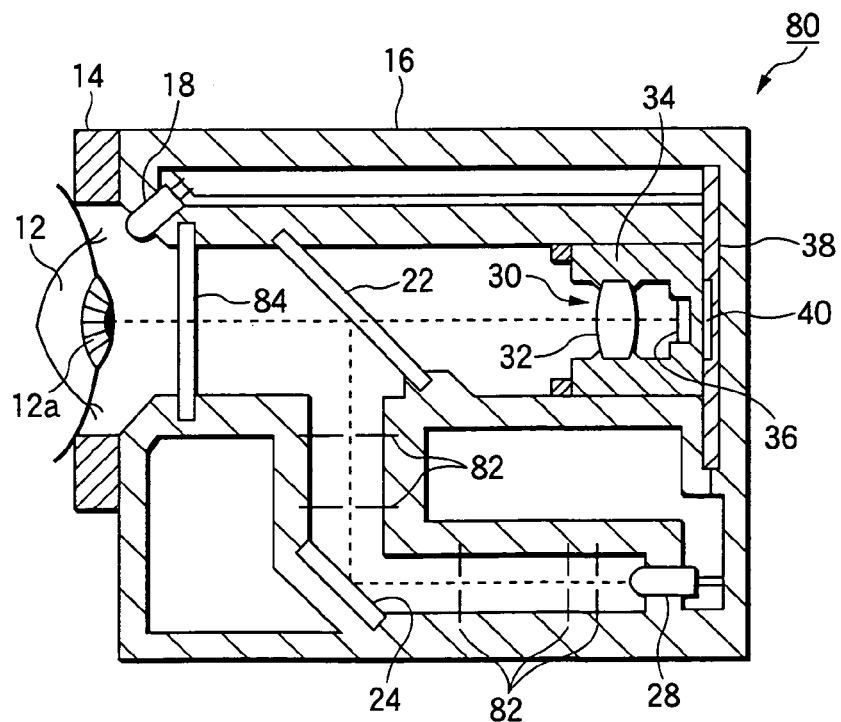
FIG. 8 is a sectional view of an iris camera module according to the third embodiment.

FIG. 8 is a sectional view of an iris camera module according to the third embodiment.

In the iris camera module 80, the same configuration as that of the iris camera module 10 in FIG. 1 is assigned the same numerals and corresponding description is omitted.

In the iris camera module 80, the positions of the image pickup optical system and the target screen optical system are reversed. The image of an iris 12a passes through the half mirror 22 and picked up by the image pickup section 30. A light from the target screen illuminating LED 28 passes through a diaphragm 82 (three stages), irradiates the target screen 24, passes through a diaphragm 82 (two stages) and reflects the display image on the target screen 24 in the direction of the eye 12 via the half mirror 22.

The iris camera module 80 does not gather external lights as illumination on the target screen 24. The iris camera module 80 uses an ocular pane 84 instead of the eyepiece 20.

Thus, employing an iris camera module according to the second embodiment or an iris camera module according to the third embodiment depending on the external shape of the portable terminal 52 and arrangement of parts and mounted parts inside the portable terminal 52, it is possible to improve the freedom of layout of an iris camera module in the portable terminal 52.

Embodiment 4

Next, configuration of an iris camera module according to the fourth embodiment will be described referring to FIG. 9.

Figure 9:
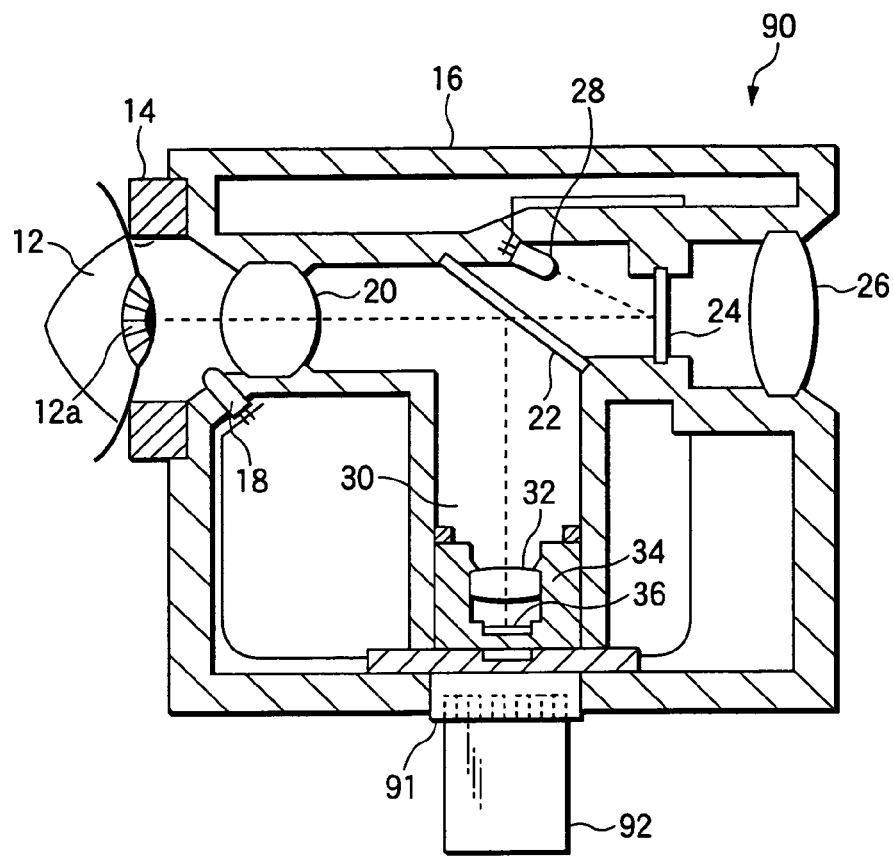
FIG. 9 is a sectional view of an iris camera module according to the fourth embodiment.
Figure 10:
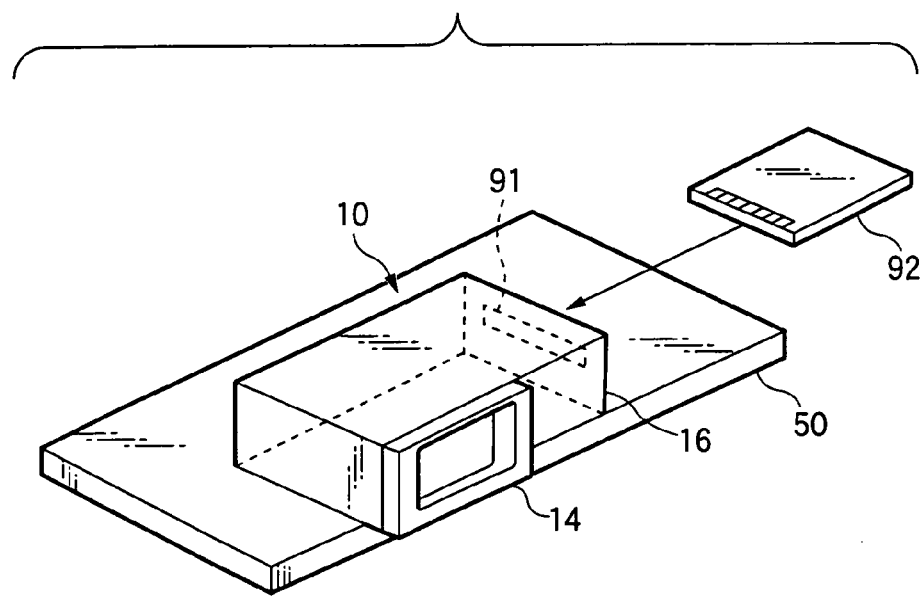
FIG. 10 is a perspective view showing the mounting state of an iris camera module.
Figure 11:
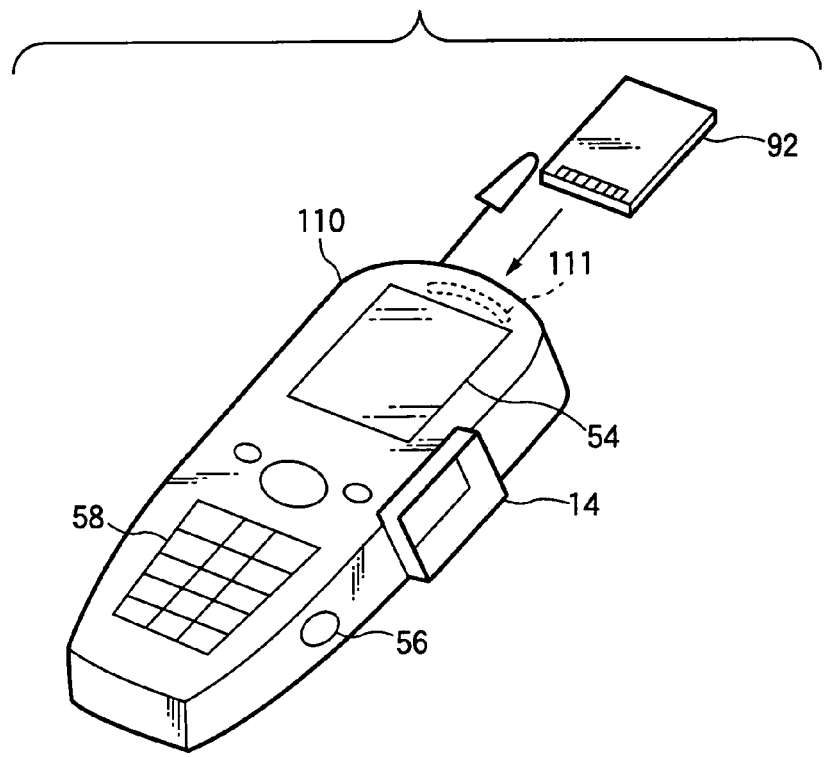
FIG. 11 is a perspective view of a portable terminal where an iris camera module is incorporated.
Figure 12:
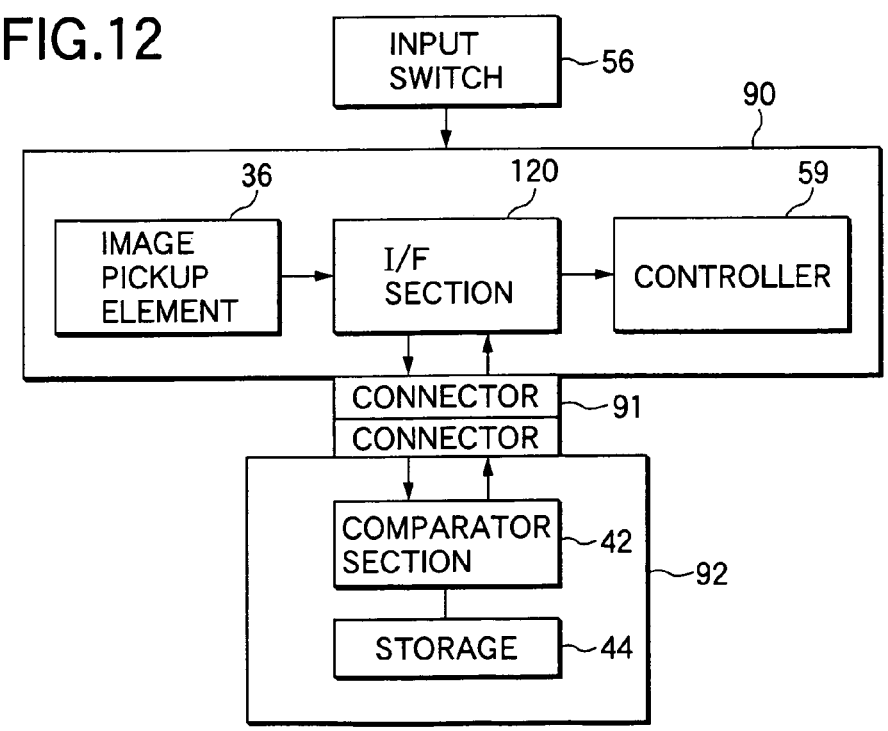
FIG. 12 is a block diagram of the configuration of an iris camera module where an external circuit is attached.

FIG. 9 is a sectional view of an iris camera module according to the fourth embodiment. FIG. 10 is a perspective view showing the mounting state of an iris camera module. FIG. 11 is a perspective view of a portable terminal where an iris camera module is incorporated. FIG. 12 is a block diagram of the configuration of an iris camera module where an external circuit is attached.

In FIG. 9, the same configuration as that of the iris camera module 10 in FIG. 1 is assigned the same numerals and corresponding description is omitted.

In the iris camera module 90, a detachable external circuit 92 is attached to the connector section 91 provided on an image pickup substrate 38. Processing by the comparison chip 40 in FIG. 1 is performed by the external circuit 92.

FIG. 10 shows the state where the iris camera module 90 is mounted on a substrate 50. As shown in FIG. 10, an external circuit is attached to the connector section provided on the side face of the iris camera module 90.

FIG. 11 is a perspective view of a portable terminal where the iris camera module 90 mounted on the substrate 50 is incorporated. In FIG. 11, the same configuration as that of the iris camera module in FIG. 3 is assigned the same numerals and corresponding description is omitted.

As shown in FIG. 11, the external circuit 92 is attached to the connector section 91 on the iris camera module via an aperture 111 of a portable terminal 110. The attaching direction of the external circuit 92 is determined by the direction of a connector on the substrate in close proximity of the image pickup element of then iris camera module.

The configuration of the iris camera module 90 where the external circuit 92 is attached will be described referring to FIG. 12. In FIG. 12, the same configuration as that of the iris camera module in FIG. 5 is assigned the same numerals and corresponding description is omitted. In FIG. 12, the comparison chip 40 in FIG. 2 is provided externally to the iris camera module. That is, the external circuit 92 performs the same operation as the comparison chip 40. An I/F section 120 is an interface connecting the iris camera module 90 and the external circuit 92.

The fourth embodiment operates the same way as the first embodiment except that the operation by the comparison chip 40 in the first embodiment is performed by the external circuit 92.

According to the fourth embodiment, by providing the detachable external circuit 92 to then iris camera module 90, it is possible to have a circuit dedicated to a person. This eliminates the need for overwriting personal iris data. That is, it is not necessary to provide an iris camera module with the overwriting apparatus 60. This allows downsizing of an iris camera module.

It is impossible to overwrite the reference iris image so that the risk of falsification of the reference iris image is eliminated.

The reference iris image and the iris image picked up by the image pickup element 36 according to the present invention is not limited to an iris image itself but an iris image pattern (information) obtained by signal-processing and coding the iris images.

According to the iris camera module of the invention, it is possible to downsize the iris camera module since the image pickup optical system and the target optical system are integrated. Thus, it is possible to incorporate the iris camera module into a portable terminal.

The image pickup section comprises an image pickup element, a storage and a comparator section so that the reference iris image does not leak outside the image pickup section thus upgrading the security.

What is claimed is:

1. An iris camera module comprising:
   an image pickup optical system for picking up an image of the iris;
   a target optical system for displaying a target for the eye; and
   a target screen where the target is displayed, wherein
   the target optical system and the image pickup optical system are integrated into a single unit, and wherein
   the image pickup optical system includes:
      an infrared illuminating section for irradiating an infrared ray onto the eye,
      an image pickup section for picking up the image of the iris by detecting the infrared ray reflected on the eye, and
      an image pickup optical section for guiding the infrared ray reflected on the eye to the image pickup section; and
   wherein the target optical system includes a target optical section for guiding the image of the target on the target screen to the eye; and further
   wherein
   the image pickup section includes:
      an image pickup element for picking up the image of the iris,
      a storage for storing a reference iris information, and
      a comparator section for comparing an information based on the image of the iris picked up by the image pickup section with the reference iris information to output the comparison result as to whether matching is obtained; and
   wherein the reference iris information can be overwritten only a predetermined number of times in the storage.

2. An iris camera module comprising:
   an image pickup optical system for picking up an image of the iris of a user; and
   a target optical system including a target screen for displaying a target for aligning the eye of the user,
   wherein the target optical system and the image pickup optical system are integrated onto a common substrate;
wherein the image pickup optical system includes:
an infrared illuminating section for irradiating an infrared ray onto the eye,
an image pickup section for picking up the image of the iris by detecting the infrared ray reflected on the eye, and
an image pickup optical section for guiding the infrared ray reflected on the eye to the image pickup section,
and further wherein the target optical system includes a target optical section for guiding the image of the target on the target screen to the eye; and wherein the image pickup section further includes:
an image pickup element for picking up the image of the iris;
a storage for storing a reference iris information; and
a comparator section for comparing an information based on the image of the iris picked up by the image pickup section with the reference iris information to output the comparison result as to whether matching is obtained,
wherein the reference iris information can be overwritten only a predetermined number of times in the storage.

3. An iris camera module comprising:
an image pickup optical system for picking up an image of the iris of a user; and
a target optical system including a target screen for displaying a target for aligning the eye of the user, wherein the target optical system and the image pickup optical system are integrated onto a common substrate;
wherein the image pickup optical system includes:
an infrared illuminating section for irradiating an infrared ray onto the eye,
an image pickup section for picking up the image of the iris by detecting the infrared ray reflected on the eye, and
an image pickup optical section for guiding the infrared ray reflected on the eye to the image pickup section; and wherein
the target optical system includes a target optical section for guiding the image of the target on the target screen to the eye;
wherein the image pickup section further includes:
an image pickup element for picking up the image of the iris; and
a connector section for coupling an external circuit detachable from the image pickup section,
and wherein the external circuit includes:
a storage for storing a reference iris information; and
a comparator section for comparing information based on the iris picked up by the image pickup section with the reference iris information to output the comparison result as to whether matching is obtained.

4. An iris camera module comprising:
an image pickup optical system for picking up an image of the iris of a user, said image optical system including:
an illuminating section for irradiating a ray onto the eye;
an image pickup section for picking up the image of the iris by detecting the ray reflected on the eye; and
an image pickup optical section for guiding the ray reflected on the eye to the image pickup section;
a target optical system for displaying a target for aligning the eye of the user, said target optical system including:
a target screen;
a target optical section for guiding the image of the target on the target screen to the eye; and
a screen illuminating section for illuminating the target screen with either ambient light or artificial light;
a storage for storing a reference iris information; and
a comparator section for comparing an information based on the image of the iris picked up by the image pickup section with the reference iris information to output the comparison result as to whether matching is obtained, wherein
the reference iris information can be overwritten only a predetermined number of times in the internal storage.

5. An iris camera module according to claim 4, wherein the image pickup optical section and the target optical section include a common half mirror for reflecting to guide the infrared ray reflected on the eye to the image pickup section and guiding the image of the target on the target screen to the eye without reflecting the image.

6. An iris camera module according to claim 4, wherein the image pickup optical section and the target optical section include a common half mirror for guiding the infrared ray reflected on the eye to the image pickup section without reflecting the infrared ray and reflecting to guide the image of the target on the target screen to the eye.

* * * * *